United States Patent [19]
Pelick et al.

[11] Patent Number: 5,805,526
[45] Date of Patent: Sep. 8, 1998

[54] ECHO DETECTION DOPPLER GATE

[75] Inventors: Thomas J. Pelick; Carroll L. Key, Jr., both of State College, Pa.

[73] Assignee: The United States of America as represented by the Secretary of the Navy, Washington, D.C.

[21] Appl. No.: 69,515

[22] Filed: Aug. 6, 1970

[51] Int. Cl.$^6$ ....................................................... G01S 15/00
[52] U.S. Cl. .............................................. 367/97; 367/904
[58] Field of Search ..................................... 340/1 R, 3 R, 340/3 D, 6 R, 16 R; 343/7 A, 7.7, 8; 367/135, 94, 95, 97, 904, 98; 342/161

[56] References Cited

U.S. PATENT DOCUMENTS

| 3,142,033 | 7/1964 | Flowers et al. | 367/98 |
| 3,176,262 | 3/1965 | Ehrlich et al. | 367/98 |

*Primary Examiner*—Daniel T. Pihulic
*Attorney, Agent, or Firm*—Harvey A. Gilbert; Kenneth W. Dobyns

[57] ABSTRACT

An automatic control system is disclosed herewith which causes the notch filter incorporated in a sonar system or any other appropriate utilization apparatus to be electrically by-passed in response to a predetermined minimum doppler present within a data signal being filtered thereby. It includes such uniquely combined elements as envelope detectors, rate-of-decay and rate-of-rise amplifiers, bistable multivibrators, an inverter, and an AND gate for adjusting the position of a selector switch connected for alternately electrically by-passing the notch filter. In addition, the gain of a variable gain amplifier disposed within an automatic gain control loop that includes the aforesaid elements and notch filter may be optionally employed to regulate the gain of the data signal supplied to said notch filter in correspondence with the by-passed and non-by-passed conditions thereof.

14 Claims, 3 Drawing Sheets

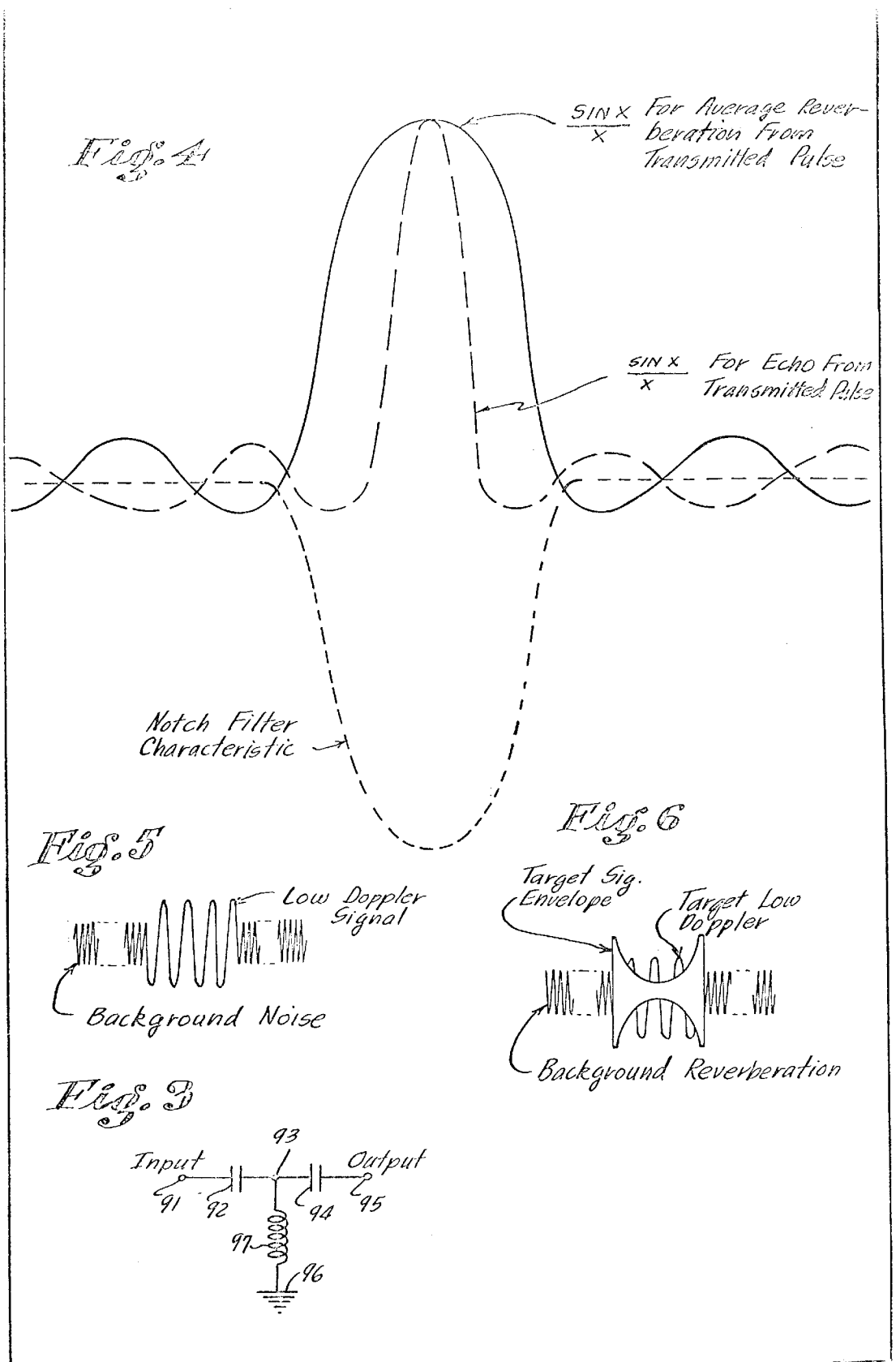

ECHO DETECTION DOPPLER GATE

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates generally to control systems and, in particular, is a system for controlling the signal-to-noise ratio of doppler signal responsive utilization apparatus. In even greater particularity, it constitutes a selector system for automatically by-passing the notch filter of a sonar receiver system, whenever the target echo doppler data signal passing therethrough falls below a predetermined minimum, as a result of little or no relative movement of an acquired target.

BACKGROUND OF THE INVENTION

As a general rule, the receiver portion of an acoustic tracking system nullifies its own doppler during its treatment of reverberation and other spurious signals to improve signal-to-noise ratio. For instance, such reverberation is treated as if it were the result of reflections of acoustic waves from stationary microscopic particles and surfaces, and, thus, a notch filter is incorporated in the sonar receiver portion of the acoustic system for the purpose of processing and filtering thereof, so as to effect enhancement of dopplered target echo-to-reverberation ratios. The notch filter, of course, performs such enhancement by rejection of some finite amount of reverberation, with said rejection being a function of the automatic frequency control (AFC) loop speed and notch depth thereof. But, it has been found by actual experimental tests, that, due to the frequency shift of reverberation, a notch filter is not always capable of rejecting the total reverberation but, instead, may only reject an average amount. On the other hand, a target echo, maintaining more consistency than reverberation, can suffer a much greater than average attenuation for a zero doppler target, and this, of course, causes an excessive degradation of the target echo signal-to-reverberation ratio.

To prevent such target echo degradation, detection of low doppler targets of less than, say, forty-eight cycles per second must be effected prior to the notch filter; but in the past, such data processing has not been accomplished in such manner as to optimize the signal-to-noise ratios obtained. Therefore, while satisfactory for some purposes, the devices of the prior art usually leave a great deal to be desired from such standpoint.

SUMMARY OF THE INVENTION

The subject invention overcomes many of the disadvantages of the prior art, in that it provides a method and means for automatically switching a notch filter in and out of a receiver channel, as required for optimizing target signal-to-reverberation ratios, in response to the amount of doppler present in the target echo signal during the tracking of an acquired target.

In this particular instance, the preferred embodiment disclosed herewith is an acoustical echo-search-homing system which is employed to guide a countermeasure vehicle toward a given marine or submarine target. However, it should be understood that it may be used in conjunction with any suitably designed echo-search-ranging or other system—such as, for example, a radar system, or the like - responsive to any suitable type of energy to track any predetermined type of target located within any given environmental medium with any appropriate tracking vehicle. Obviously, so doing would be well within the purview of one skilled in the art having the benefit of the teachings presented herewith, inasmuch as making the transition from one to the others would merely be a matter of making the proper design choices.

In view of the foregoing, it is, therefore, an object of this invention to provide an improved method and means for detecting slow-moving and stationary targets.

Another object of this invention is to provide a method and means for detecting slow-moving and stationary targets by a vehicle that is homing thereon.

Another object of this invention is to provide an improved vehicle guidance system.

Still another object of this invention is to provide a sonar guidance system which facilitates the detection of and homing on a slow-moving or stationary underwater target by a submarine vehicle.

A further object of this invention is to provide a control system for automatically by-passing a notch filter in a doppler signal responsive utilization apparatus in response to a predetermined minimum doppler frequency signal being processed thereby.

Another object of this invention is to provide a method and means for removing a notch filter from a utilization apparatus in response to predetermined entrance and exit signals thereto and therefrom, respectively.

Another object of this invention is to provide a control system for automatically by-passing a notch filter incorporated in a sonar receiver channel in response to predetermined doppler signals passing therethrough.

Still another object of this invention is to provide an improved method and means for automatically and simultaneously removing a notch filter from a sonar or other type receiver channel and controlling the gain of the signal supplied thereto in response to predetermined doppler signals passing therethrough.

Another object of this invention is to provide an improved echo-search-ranging system.

Another object of this invention is to provide an improved sonar receiver system.

Still another object of this invention is to provide an improved acoustical or other target tracking system.

Still another object of this invention is to provide an improved underwater or other missile guidance system.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 3 is a schematic diagram of the type of notch filter that is typically included in and automatically by-passed by the subject invention;

FIG. 4 graphically illustrates the $$\frac{\sin x}{x}$$

characteristics of a typical reverberation signal, the $$\frac{\sin x}{x}$$

characteristics of a target echo signal, and the notch filter characteristic superimposed on one another;

FIG. 5 depicts a representative target echo signal waveform showing background noise and low doppler signal;

FIG. 6 shows a representative target echo signal with an exaggerated target signal envelope combined with background reverberation and low target doppler signals.

DESCRIPTION OF THE PREFERRED EMBODIMENT

Figure 1:
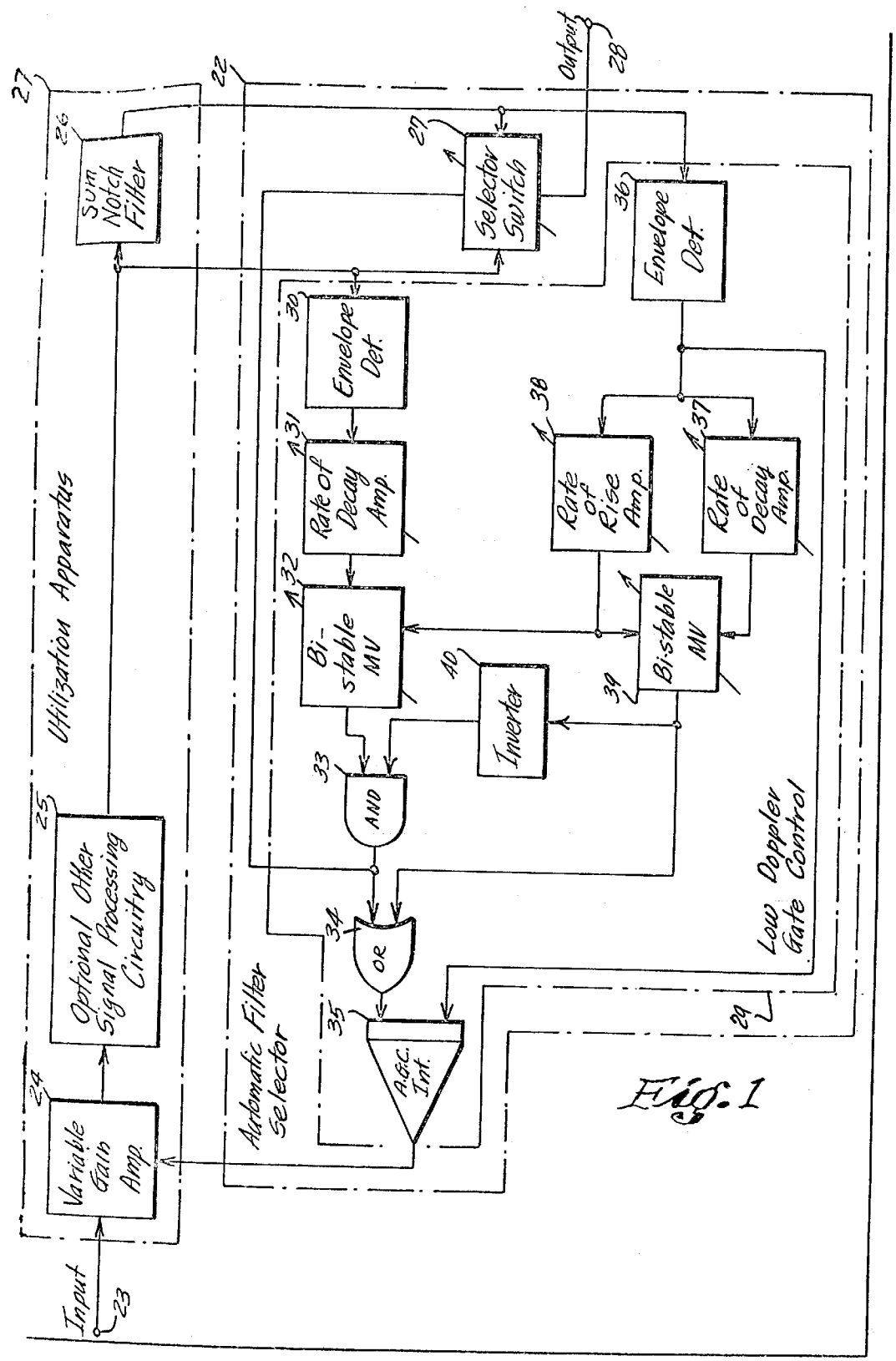
FIG. 1 is a block diagram of the system constituting this invention.

Referring now to FIG. 1, there is shown a utilization apparatus 21, which may be of any type that is compatible with automatic filter selector 22. For example, as previously suggested, it may be an acoustical receiver channel, a radar receiver channel, or any other type of device that requires that a notch filter be selectively included therein or excluded therefrom according to the type of signals being filtered thereby.

Utilization apparatus 21 has an input terminal 23 which is preferably connected to the data signal input of a variable gain amplifier 24, the output of which is connected to the input of other optional signal processing circuitry 25 that may be required by any given type of utilization apparatus 21 for the optimum operation thereof. The output of optional other signal processing circuitry 25 is connected to the input of a sum notch filter 26, the component which will effectively be switched in and out of utilization apparatus 21 in response to the doppler signal characteristics being processed thereby.

Connected in parallel with sum notch filter 26—that is, between the input and output thereof—is a controllable (and optionally over-rideable) selector switch 27, with the output thereof connected to an output terminal 28. Of course, in this particular preferred embodiment, output terminal 28 constitutes the output of the subject system.

Likewise connected to the control input of variable gain amplifier 24 and the input and output of sum notch filter 26 is the aforesaid automatic filter selector 22, and it is this part of the overall system which, in conjunction with a low doppler gate control 29 included therein, automatically effects the inclusion or exclusion of sum notch filter 26 in and out of utilization apparatus 21, as the case may be, and simultaneously therewith adjusts the gain of variable gain amplifier 24.

Thus, the input of sum notch filter 26 is connected to one of the inputs of low doppler gate control 29 because it is connected to the input of an envelope detector 30. The output of envelope detector 30 is connected to the input of a rate-of-decay amplifier 31.

Rate-of-decay amplifier 31 is the type of device that produces an output signal when the amplitude or the effective amplitude of the signal supplied thereto decreases at a predesigned rate and, hence, has a predetermined downward slope characteristic. Such amplifier may be, for instance, of the type that includes a logical inverter combined with a rate-of-rise amplifier of the type disclosed at page 40 of the book entitled PULSE, DIGITAL, AND SWITCHING WAVEFORMS by Millman and Taub, published by McGraw-Hill Book Company in 1965. Of course, any other suitably designed rate-of-decay amplifier may be substituted therefor, if so desired, inasmuch as so doing would be merely a matter of design choice, the making of which would be well within the purview of one skilled in the art having the benefit of the teachings presented herewith.

The output of rate-of-decay amplifier 31 is connected to the "off" control input of a bistable multivibrator 32, with the output thereof connected to one of the inputs of an AND gate 33. The output of AND gate 33 is connected to the control input of the aforementioned selector switch 27 and to one of the inputs of an OR circuit 34; and the output of OR circuit 34 is, in turn, connected to one of the inputs of an automatic gain control (AGC) integrator 35, the output of which is connected to the control input of the aforesaid variable gain amplifier 24 of utilization apparatus 21.

The input of envelope detector 36 constitutes another of the inputs of low doppler gate control 29. Like envelope detector 30, envelope detector 36 detects the high frequency of the input signal thereto and produces an output signal representing the envelope thereof. Its output is connected to the inputs of another rate-of-decay amplifier 37 and a rate-of-rise amplifier 38 (of the types similar to those mentioned above) and to the other input of the aforesaid AGC integrator 35. The outputs of rate-of-decay amplifier 37 and rate-of-rise amplifier 38 are respectively connected to the "off" and "on" control inputs of another bistable multivibrator 39, and the output of said rate-of-rise amplifier 38 is also connected to the "on" control input of the aforesaid bistable multivibrator 32. The output of bistable multivibrator 39 is connected to the other input of the aforementioned OR circuit 34 and to the input of a logical inverter 40, the output of which is connected to the other input of AND gate 33.

Figure 2:
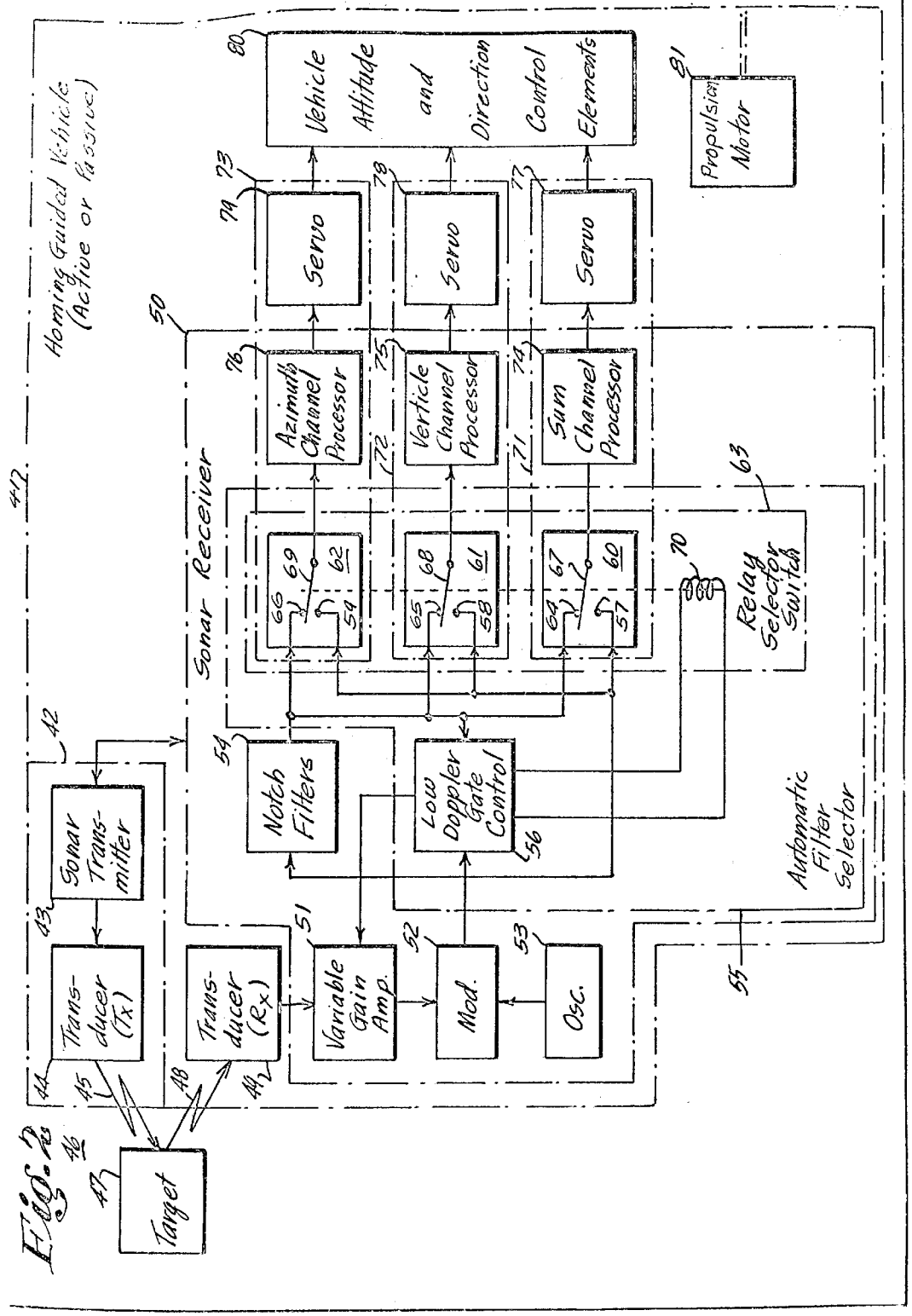
FIG. 2 is a block diagram of an exemplary vehicle guidance system incorporating the subject invention.

The device of FIG. 2 is a representative embodiment of a target seeking vehicle, and, obviously, it may be used for any appropriate purpose. Accordingly, it may be a homing guided missile, torpedo, or the like; it may be employed in one or more of any predetermined environments, provided it is designed therefore; it may be a countermeasure weapon or merely a homing or guided vehicle. Hence, for disclosure purposes, and not by way of limitation, FIG. 2 symbolically depicts a self-propelled, homing, guided vehicle 41 of the underwater type which may be either active or passive, as such terms are employed in the sonar art. It includes any suitable means 42 for broadcasting energy, such as, for example, acoustical energy, throughout the ambient subaqueous environmental medium for the purpose of acquiring the target upon which to home. In this particular case, a sonar transmitter 43 has its output connected to the input of an electroacoustical transmitting transducer 44 for such purpose. Transducer 44, in turn, broadcasts acoustical energy 45 throughout the ambient water 46 for reflection thereof by a target 47 as an echo 48 back to an electroacoustical receiving transducer 49.

The output of transducer 49 is connected to the input of a sonar receiver 50, which is appropriately connected to the aforesaid sonar transmitter 42 for synchronization or correlation purposes, as required.

Actually, the output of the aforementioned receiving transducer 49 is coupled to the data signal input of a variable gain amplifier 51, the output of which is connected to one of the inputs of a mixer or modulator 52. The other input of modulator 52 is connected to the output of a local oscillator 53, and the output of modulator 52 is connected to the input of notch filters 54, details of which will be discussed subsequently in conjunction with FIG. 4.

The output of modulator 52 is also connected to the input of an automatic filter selector 55 and, more specifically, to the input of a low doppler gate control 56 included therein. It is also connected to a plurality of interconnected switch contacts 57, 58, and 59 of a like plurality of double-pole-single-throw switches 60, 61, and 62 of a relay selector switch 63. Switches 60, 61, and 62 also have an alternate plurality of contacts 64, 65, and 66, which are interconnected and coupled to the output of notch filters 54. Movable arms 67, 68, and 69 of switches 60, 61, and 62 are adapted for simultaneous movement between contacts by means of ganging, and the contact positions thereof are controlled by the energization and de-energization of a solenoid 70 connected to the control outputs of low doppler gate control 56. In this particular case, said switches 60 through 62 are shown in this normally closed contact positions when solenoid 70 is de-energized. The outputs of switches 60, 61, and 62 are taken from movable arms 67, 68, and 69, respectively.

The other input of low doppler gate control 56 is connected to the output one of notch filters 54 and, of course, such connection effectively causes it to be connected in parallel therewith.

For all practical purposes, switches 60, 61, and 62 are also located in a trio of receiver channels 71, 72, and 73, and, accordingly, the outputs thereof are respectively connected to such data signal processors as sum channel processor 74, vertical channel processor 75, and azimuth channel processor 76. The outputs thereof are respectively connected to the inputsof servos 77, 78, and 79, which, in turn, are respectively connected to the appropriate vehicle altitude and direction control elements 80. Of course, the aforesaid channel processors may include limiters, resolvers, filters, etc., as necessary to effect the optimizing of the processing of the signal passing therethrough to accomplish its particular assigned altitude and/or direction control duty, and vehicle altitude and direction control elements 80 may, obviously, be those types that are suitable for the type of vehicle involved. For example, they may be controllable surfaces, or jets, or the like, if vehicle 41 happens to be an underwater or other marine vehicle.

To provide vehicle 41 with mobile characteristics for homing or other purposes, any suitable propulsion motor 81 may be incorporated therein.

At this time, it should perhaps be stated that all of the aforementioned blocks of FIGS. 1 and 2 represent elements and devices which are well known and conventional per se; hence, it should be understood that it is their unique interconnections and interactions that produce the subject invention and the new and/or improved results effected thereby. Accordingly, the proper selection thereof by an artisan having the teachings herewith presented would be well within his purview, if he wanted to use the subject invention in any predetermined environmental medium.

Referring now to FIG. 3, there is depicted a notch filter that is typical of that which may be incorporated in the invention. It includes an input terminal 91 connected to one of the plates of a capacitor 92, the other plate of which is connected by means of a common junction 93 to one of the plates of another capacitor 94, the other plate of which is connected to an output terminal 95. Between said common junction 93 and a ground 96 is an inductance 97.

FIGS. 4 through 6, not being structural in nature, will be explained during the discussion of the operation of the invention.

THEORY OF OPERATION

As previously suggested, the receiver portion of an acoustic tracking system nullifies its own doppler during its treatment of reverberation consisting of reflections of sonic energy from stationary microscopic particles and surfaces. Therefore, to enhance target echo doppler signals and, thus, reduce reverberation, notch filters are ordinarily included in the signal processing channels of said receivers, thereby improving the doppler echo-to-reverberation ratios. Notch filters perform such enhancement by finitely rejecting some reverberation in accordance with the depth thereof and the automatic frequency control loop speed.

By experimental tests of one exemplary specific system, it has been determined that, with a notch filter attenuation of 20 db and a 3 db bandwidth of 84 cycles per second, the amount of reverberation rejection varies from a few db to 20 db and averaged about 13 db, due to the frequency shift of the reverberation. Then the notch width was determined by using a frequency spectrum of an average blob of reverberation. Referring to FIG. 4, the $$\frac{\sin x}{x}$$

characteristic of reverberation, an echo with no extension, and the notch characteristic are shown graphically for relative comparison. It may thus be seen therefrom that, since the notch is based on an average blob of reverberation and the blobs vary in width and frequency—due to velocity vectors of a moving acoustic system with respect to ceiling and bottom returns, as compared to those volume reverberation returns straight ahead of the tracking or homing vehicle—the notch filter is not always capable of rejecting a full 20 db of reverberation. Instead, it only rejects an average amount. But the target echo, maintaining more consistency than the reverberation, can suffer as much as 20 db attenuation for zero target doppler—much more than that of the reverberation, for all practical purposes—and, accordingly, such attenuation becomes an adverse degradation of the echo-to-reverberation ratio for that particular situation. Thus, it may readily be seen that if this adverse situation is to be prevented, the detection of low doppler targets—say, less than 48 cycles per second—must be effected prior to the notch filter; and to accomplish this, the notch filter must be effectively removed from the receiver circuit by being switched in and out thereof by electrical by-passing, or the like.

The device of this invention has been constructed in such manner that electrical by-passing of the aforesaid notch filter (for the purpose of detecting slow-moving or stationary targets) is accomplished as a result of its being responsive to target echoes having predetermined rise time slope, amplitude, and envelope parameters, which are proportional to doppler signal effective strength or processing utility.

FIG. 5 shows idealized waveforms of both background noise and a low doppler target signal; and it may be seen therefrom that the frequency of the received target echo is small compared to that of the background noise, while the amplitude thereof is usually somewhat larger.

If, after passing through the notch filter, the low doppler target echo is differentiated or detected by an envelope detector, the target signal envelope thereof is obtained, and it acquires a waveform characteristic similar to that ideally illustrated in FIG. 6. Hence, it may also be seen that because the target signal envelope contains rate-of-decay and rate-of-rise characteristics which are proportional to target doppler frequency, such characteristics may be employed to trigger appropriate associated apparaters to timely and automatically by-pass the notch filter to effectively take it out and put it back into the receiver circuit, depending on said doppler frequency. In other words, in simple terms, when the output signal from the notch filter falls to a certain low doppler frequency, the envelope thereof likewise falls; and when the rate of fall or decay thereof reaches and/or falls below a certain predetermined value, the notch filter is automatically by-passed by the subject invention. On the other hand, when the target envelope rate of rise reaches and/or exceeds the aforesaid certain predetermined value, the invention causes it to be switched back into the receiver channel. Thus, it may readily be seen that the notch filter is employed only when the data output signal therefrom has sufficient amplitude to be of a useful level above the reverberation or background noise signals; and when such data signal is too degraded (as a result of low target doppler) by the notch filter to be effectively processed further, it is sensed prior to or at the input of the notch-filter, thereby improving the signal-to-noise ratio thereof for the particular doppler involved.

MODE OF OPERATION

The operation of the invention will now be discussed briefly in conjunction with all of the figures of the drawing.

Considering first the more generalized embodiment and application of the invention shown in FIG. 1, two operational conditions pertinent thereto will be discussed:

1. The condition where the input doppler frequency is sufficiently high to warrant keeping notch filter 26 in the signal processing channel of utilization apparatus 21; and 2. The condition when the input doppler frequency is too low—say, less than 48 cycles per second—to prevent additional degradation thereof if it is further processed by notch filter 26.

In both situations, the dopplerized data signal is supplied to input terminal 23,-from which it is conducted to and through variable gain amplifier 24 and any other optional signal processing circuitry 25 before being supplied to the input of notch filter 26. But, in the first mentioned case, because the doppler frequency is high enough to prevent excessive degradation therein, it passes therethrough and through selector switch 27 (normally closed for electrical conduction to the output thereof) to output terminal 28. Such operation is automatically effected by automatic filter selector 22, including low doppler gate control 29.

In such case, the instant the input doppler signal is supplied to notch filter 26, it is also detected by detector 30 to obtain the envelope thereof. And because the rate of decay of said envelope does not exceed the trigger decay slope preset in rate of decay amplifier 31 at that time, no signal (defined herewith as being a "zero") occurs at the output thereof, bistable multivibrator 32 is turned off, AND gate 33 is not enabled, and, thus, it, too, has an instantaneous "zero" at the output thereof. Hence, no energizing signal is supplied to the control input of selector switch 27, and it remains closed in such manner that the output of notch filter 26 is directly connected to output terminal 28, thereby retaining notch filter 26 in the signal processing circuit or channel of utilization apparatus 21, at that time. However, in addition, the adequately dopplerized output signal then passes through notch filter 26 and is detected by envelope detector 36. But because it is not amplitude degraded thereby, it does not have a rate of decay that will trigger the preset rate of decay amplifier 37, and no output signal (a "zero") occurs at the output thereof. Thus, bistable multivibrator 39 is kept turned off to effect production of a "zero" at the output thereof that is supplied to the other input of AND gate 33, as a result of such condition. However, because said dopplerized signal is not amplitude degraded sufficiently to enable rate of decay amplifier 37, its amplitude slope characteristic at that particular instant is such that it exceeds the present enabling value of rate of rise amplifier 38; hence, it is turned on, thereby producing a signal (herewith defined as being a "one") at the output thereof. Said "one" then triggers both bistable multivibrators 32 and 39 on to effect production of "ones" at the outputs thereof, respectively. The "one" from bistable 32 is supplied to one of the inputs of AND gate 33, and the "one" from bistable multivibrator 39 is converted to a "zero" by logical inverter 40, which is then supplied to the other input of AND gate 33. Having a "one" and a "zero" as inputs at that particular time, AND gate 33 has a "zero" output, and, thus, selector switch 27 is not energized, thereby causing it to remain in its normally closed position.

During both aspects of such case, OR circuit 34 has at least one "one" supplied thereto, so the output therefrom is also a "one", and this is the signal that is supplied to one of the inputs of AGC integrator 35. The AGC loop, which is defined by the feedback loop from notch-filter 26, via envelope detector 36 to integrator 35, is held by a "one" at the output of "OR" gate 34. This maintains a constant gain in the AGC loop by holding AGC integrator 35 at a fixed value, thereby stabilizing the gain of variable gain amplifier 24. If a "zero" is present, the AGC loop will function in the normal state as a type one servo and will maintain the output of notch filter 26 at a constant value. The function of interrupting the AGC loop is to provide constant gain and to allow the signal level to rise above the nominal notch filter output for signal processing, for echo detection and for steering.

Case 2, mentioned above, involves a data signal being supplied to notch filter 26 which has a low signal-to-noise ratio as a result of low target doppler being present therein. Hence, as it passes through notch filter 26 the target signal is degraded even more, perhaps to the level where it is no longer useful for further processing purposes. Therefore, to prevent such further degradation, it becomes necessary to exclude said notch filter by by-passing it. Of course, this is accomplished by energizing selector switch in such manner that the input to notch filter 26 is connected directly to output terminal 28.

To effect such switching in response to low frequency doppler is the function of automatic filter selector 22, including low doppler gate control 29. Because of the low doppler present in the input to notch filter 26, it is also present in the input to envelope detector 30. Hence, the decayed envelope output therefrom exceeds the preset trigger slope of rate of decay amplifier 31 and causes it to produce a "one" at the output thereof. This, in turn, enables bistable multivibrator 32 and causes a "one" to also occur at the output thereof, which, of course, is supplied to one of the inputs of AND gate 33. In addition, the further degraded output signal from notch filter 26 is supplied to envelope detector 36, which extracts the envelope thereof and couples it to the inputs of preset rate of decay amplifier 37 and preset rate of rise amplifier 38 for the respective triggering thereof, depending on the amount and direction of the slope of said envelope. In this example, the envelope is decaying and, thus, it triggers rate of decay amplifier 37 in such manner as to cause a signal to be supplied to bistable multivibrator 39, turning it off, and thereby producing a "zero" at the output thereof. This "zero" signal is inverted to a "one" by logical inverter 40, and this "one" is supplied to the other input of AND gate 33.

From the foregoing, it may now be seen that two "ones" are simultaneously supplied to AND gate 33, and, consequently, a "one" is produced at the output thereof. This "one" is supplied to the control input of selector switch 27 for the switching thereof in such manner that the input to notch filter 26 is directly connected to output terminal 28 to, in turn, effect the by-passing of said notch filter 26.

Because a "one" is the type of signal supplied by AND gate 33 to one of the inputs of OR circuit 34, the output thereof is likewise a "one" and, therefore, it is supplied to one of the inputs of AGC integrator 35. The "one" signal initiates a holding action on the AGC loop by maintaining variable gain amplifier 24 at a fixed constant gain value, thereby allowing the data signal to be processed with sufficient signal-to-noise ratio.

After the "one" signal at AGC integrator 35 changes to a "zero", the AGC loop is permitted to function by normalizing the amplitude-varying reverberation characteristics. Accordingly, the no or low doppler signals are initially amplified to a more useful level before being effectively supplied to notch filter 26.

From the foregoing, it may readily be seen that a notch filter type of electronic component may be automatically switched in and out of a utilization apparatus in response to the amount of doppler being present in the data signal being processed thereby.

The device of FIG. 2 likewise has the notch filter thereof automatically switched in and out of the sonar receiver portion thereof.

In this particular exemplary embodiment of the invention, the aforementioned utilization apparatus happens to be a homing guided vehicle 41 of the underwater type; but, it could be a guided torpedo, missile, submarine, or the like. Of course, it is not intended that the invention be limited thereto, inasmuch as previously suggested, it may be designed to be any type vehicle that will function properly in any environmental medium, without violating the spirit and scope of the invention.

Likewise, it should be understood that it may be either active or passive, as such terms are conventionally used in the sonar and radar arts. Of course, to make it passive, would merely involve the deletion of the transmitter and transmitting transducer portions thereof.

In order to keep this disclosure as simple as possible, it is herewith disclosed that the subject invention may include any of many conventional guidance systems which incorporate notch filters to an advantage. Accordingly, the device of FIG. 2 is disclosed merely to provide a teaching thereof. Except for the inclusion of automatic filter selector 63, its operation is straightforward and would ostensively be readily understood by the artisan. Of course, automatic filter selector 63 works in a manner similar to that of automatic filter selector 22 of the system of FIG. 1. Therefore, further discussion is not believed to be warranted or ncessary at this time.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A system for automatically by-passing a notch filter incorporated in a utilization apparatus in response to predetermined doppler signals being filtered thereby, comprising in combination:

means connected between the input and output of said notch filter for the by-passing thereof in response to a predetermined control signal supplied thereto; and means connected between the input and output of said notch filter and to the control signal input of the aforesaid notch filter by-passing means for supplying said predetermined control signal thereto whenever the frequency of the doppler signals being filtered by said notch filter is lower than a preset frequency.

2. The system of claim 1, wherein said utilization apparatus comprises a target echo-search system.

3. The system of claim 1, wherein said utilization apparatus comprises an active sonar system.

4. The system of claim 1, wherein said utilization apparatus comprises a sonar receiver.

5. The system of claim 1, wherein said utilization apparatus comprises a passive sonar system.

6. The system of claim 1, wherein said utilization apparatus at least includes a radar system.

7. The device of claim 1, wherein said utilization apparatus comprises a self-propelled, mobile, homing, guided vehicle.

8. The device of claim 1, wherein said notch filter comprises:

an input terminal;

a first capacitance, with one of the plates thereof connected to said input terminal;

a second capacitance, with one of the plates thereof connected to the other plate of said first capacitance by means of a common junction;

an output terminal connected to the other plate of said second capacitance;

a ground; and an inductance connected between said ground and the aforesaid common junction.

9. The device of claim 1 wherein said means connected between the input and output of said notch filter for the by-passing thereof in response to a predetermined control signal supplied thereto is a switch comprising:

a first fixed contact connected to the input of said notch filter;

a second fixed contact connected to the output of said notch filter;

a movable arm normally in contact with said second contact but adapted for being moved into contact with the aforesaid first fixed contact; and a solenoid effectively connected to said movable arm for the movement thereof into contact with said first fixed contact when energized by said predetermined control signal.

10. The device of claim 1, wherein said means connected between the input and output of said notch filter and to the control signal input of the aforesaid notch filter by-passing means for supplying said predetermined control signal thereto whenever the frequency of the doppler signals being filtered by said notch filter is lower than a preset frequency comprises:

means connected to the input of said notch filter for timely producing a first signal when the slope of the input signal thereto has a rate of decay that is proportional to a predetermined doppler frequency;

means connected to the output of said notch filter for timely producing a second signal when the slope of the output signal therefrom has a rate of decay that is proportional to the aforesaid predetermined doppler frequency;

means connected between the outputs of said first and second signal producing means and the control signal input of said notch filter by-passing means for supplying said predetermined control signal thereto in response to the simultaneous reception of said first and second signals.

11. The system of claim 1, wherein said utilization apparatus comprises:

a sonar system having said notch filter included in the receiver portion thereof;

a mobile marine vehicle housing said sonar system, said mobile vehicle having means for effecting the propulsion and guidance thereof; and means connected between the output of the receiver portion of said sonar system and the input of the aforesaid guidance means of said mobile marine vehicle for controlling the attitude and direction of travel thereof.

12. The device of claim 1, wherein said means connected between the input and output of said notch filter and to the control signal input of the aforesaid notch filter by-passing means for supplying said predetermined control signal thereto whenever the frequency of the doppler signals being filtered by said notch filter is lower than a preset frequency comprises:

a first envelope detector connected to the input of said notch filter;

a first rate of decay amplifier connected to the output of said first envelope detector;

a first bistable multivibrator having a pair of inputs and an output, with one of the inputs thereof connected to the output of said first rate of decay amplifier;

an AND gate having a pair of inputs and an output, with one of the inputs thereof connected to the output of said first bistable multivibrator, and with the output thereof connected to the control signal input of the aforesaid notch filter by-passing means;

a second envelope detector connected to the output of said notch filter;

a second rate of decay amplifier connected to the output of said second envelope detector;

a rate-of-rise amplifier having an input and an output, with the input thereof connected to the output of said second envelope detector, and with the output thereof connected to the other input of the aforesaid first bistable multivibrator;

a second bistable multivibrator having a pair of inputs and an output, with one of the inputs thereof connected to the output of said second rate of decay amplifier, and with the other input thereof connected to the output of said rate of rise amplifier; and an inverter connected between the output of said second bistable multivibrator and the other input of the aforesaid AND gate.

13. The invention of claim 12 further characterized by:

a variable gain amplifier having an input adapted for receiving dopplerized data signals, a control input, and an output effectively connected to the input of the aforesaid notch filter;

an OR circuit having a pair of inputs and an output, with one of the inputs thereof connected to the output of said AND gate, and with the other input thereof connected to the output of the aforesaid second bistable multivibrator;

an AGC integrator having a pair of inputs and an output, with one of the inputs thereof connected to the output of said OR circuit, with the other input thereof connected to the output of said second envelope detector, and with the output thereof connected to the control input of the aforesaid variable gain amplifier.

14. The invention of claim 13 further characterized by:

a sonar system having said notch filter and said variable gain amplifier included in the receiver portion thereof;

a mobile marine vehicle housing said sonar system, said mobile vehicle having means for effecting the propulsion and guidance thereof; and means connected between the output of the receiver portion of said sonar system and the input of the aforesaid guidance means of said mobile marine vehicle for controlling the attitude and direction of travel thereof.

* * * * *